United States Patent
Park

(10) Patent No.: US 9,678,693 B2
(45) Date of Patent: Jun. 13, 2017

(54) METHOD OF SETTING WIRELESS CONNECTION VIA NEAR FIELD COMMUNICATION FUNCTION AND IMAGE FORMING APPARATUS FOR PERFORMING THE METHOD

(71) Applicant: Samsung Electronics Co., Ltd., Suwon-si, Gyeonggi-do (KR)

(72) Inventor: Hyun-wook Park, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 14/831,022

(22) Filed: Aug. 20, 2015

(65) Prior Publication Data
US 2016/0054962 A1 Feb. 25, 2016

(30) Foreign Application Priority Data
Aug. 21, 2014 (KR) .................. 10-2014-0109048

(51) Int. Cl.
| | |
|---|---|
| G06F 3/12 | (2006.01) |
| H04B 5/00 | (2006.01) |
| H04W 4/00 | (2009.01) |
| H04L 12/24 | (2006.01) |
| H04L 29/12 | (2006.01) |

(Continued)

(52) U.S. Cl.
CPC ............ *G06F 3/1236* (2013.01); *H04B 5/00* (2013.01); *H04L 41/00* (2013.01); *H04L 61/2007* (2013.01); *H04W 4/008* (2013.01); *H04W 12/04* (2013.01); *H04W 12/06* (2013.01)

(58) Field of Classification Search
None
See application file for complete search history.

(56) References Cited

U.S. PATENT DOCUMENTS

2011/0075209 A1* 3/2011 Maekawa .......... H04N 1/00204
358/1.15
2013/0198412 A1* 8/2013 Saito .................. H04L 29/12009
709/245

(Continued)

FOREIGN PATENT DOCUMENTS

EP 2 645 812 A2 10/2013

OTHER PUBLICATIONS

Nakfour et al., Methods for Out-of-Band Peer to Peer WLAN Configuration, Motorola, Inc., Mobile Device Business Unit, IP.com Prior Art Database, Oct. 17, 2008, pp. 1-12, IP.com No. IPCOM000175673D, IP.com, Inc.

*Primary Examiner* — Thomas D Lee
(74) *Attorney, Agent, or Firm* — Jefferson IP Law, LLP

(57) ABSTRACT

A method of configuring a wireless connection of an image forming apparatus via near field communication (NFC) is provided. The method includes receiving, by the image forming apparatus, wireless configuration information and Internet protocol (IP) address configuration information from a mobile device when the mobile device is tagged by the image forming apparatus, performing, user authentication of the mobile device with respect to the image forming apparatus, establishing communication between the image forming apparatus and an access point (AP) based on the wireless configuration information, and assigning an IP address to the image forming apparatus based on the IP address configuration information.

14 Claims, 11 Drawing Sheets

(51) Int. Cl.
*H04W 12/06* (2009.01)
*H04W 12/04* (2009.01)

(56) References Cited

U.S. PATENT DOCUMENTS

| | | |
|---|---|---|
| 2013/0229690 A1 | 9/2013 | Sumita et al. |
| 2013/0260682 A1* | 10/2013 | Suzuki .................. H04W 88/06 455/41.1 |
| 2013/0260683 A1 | 10/2013 | Suzuki et al. |
| 2014/0213177 A1 | 7/2014 | Terwilliger et al. |

* cited by examiner

METHOD OF SETTING WIRELESS CONNECTION VIA NEAR FIELD COMMUNICATION FUNCTION AND IMAGE FORMING APPARATUS FOR PERFORMING THE METHOD

CROSS-REFERENCE TO RELATED APPLICATION(S)

This application claims the benefit under 35 U.S.C. §119(a) of a Korean patent application filed on Aug. 21, 2014 in the Korean Intellectual Property Office and assigned serial number 10-2014-0109048, the entire disclosure of which is hereby incorporated by reference.

TECHNICAL FIELD

The present disclosure relates to a method of configuring a wireless connection by using a near field communication (NFC) function and an image forming apparatus for performing the method.

BACKGROUND

Near field communication (NFC) is a contactless short-range wireless communication protocol that allows electronic devices to communicate wirelessly within a short distance of around 10 cm or less with low power consumption by using a frequency of 13.56 MHz. NFC has a data transfer rate around 424 Kbps and is highly secure due to the use of high proximity and encryption technology. NFC does not use a complicated pairing process for device recognition and allows devices to recognize each other within 0.1 seconds or less. In particular, NFC, which is a smart card type contactless wireless communication technology based on radio frequency identification (RFID) technology which allows bi-directional communication and a relatively large memory storage space compared to other existing smart cards. NFC may be used for a variety of different services. Accordingly, electronic devices, such as smartphones and personal computers (PCs), using NFC have recently been released. Also, NFC has been recently used for image forming apparatuses.

Moreover, an image forming apparatus generally includes a keypad user interface and use thereof is not relatively easy. Even in the case of an image forming apparatus that includes a touchscreen user interface, a menu displayed on the touchscreen may be difficult to navigate. Thus, a user may have difficulties in manipulating the user interface of an image forming apparatus in order to perform a variety of tasks. Accordingly, when a user intends to configure a wireless connection between an image forming apparatus to another electronic device, the user has to configure the wireless connection of the image forming apparatus to the other electronic device by manipulating a complicated user interface at the image forming apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of configuring a wireless connection by using a near field communication (NFC) function and an image forming apparatus for performing the method. In the case of an image forming apparatus having an NFC function, the NFC function may be used to allow a user to conveniently and safely configure a wireless connection between the image forming apparatus and an access point (AP).

Another aspect of the present disclosure is to provide a computer readable recording medium having recorded thereon a computer program for executing the method of configuring a wireless connection using the NFC function.

In accordance with an aspect of the present disclosure, a method of configuring a wireless connection of an image forming apparatus via NFC is provided. The method includes when a mobile device is tagged by the image forming apparatus, receiving, by the image forming apparatus, wireless configuration information and Internet protocol (IP) address configuration information from the mobile device, performing user authentication of a user associated with the mobile device with respect to the image forming apparatus, connecting the image forming apparatus to an AP based on the wireless configuration information, and assigning an IP address to the image forming apparatus according to the IP address configuration information.

The assigning of the IP address may include assigning, by the AP, an IP address to the image forming apparatus according to a method of IP addressing of the IP address configuration information or assigning, by the image forming apparatus, an IP address included in the IP address configuration information to the image forming apparatus.

The wireless configuration information and the IP address configuration information may be input to the mobile device via a user interface of the mobile device.

The wireless configuration information may be generated when the mobile device is connected to the AP.

The image forming apparatus may not request transmission or receipt of information to or from the mobile device, and according to a request of the mobile device, the image forming apparatus may receive and store the wireless configuration information and the IP address configuration information from the mobile device, or read out information stored in the image forming apparatus.

The receiving of the wireless configuration information and the IP address configuration information may further include receiving user authentication information from the mobile device, and the performing of the user authentication may include comparing authentication information stored in advance in at least one selected from the image forming apparatus and a server connected to the image forming apparatus with the received user authentication information.

If the user authentication fails, the image forming apparatus may not be connected to the AP.

In accordance with another aspect of the present disclosure, an image forming apparatus that supports NFC function is provided. The image forming apparatus includes an NFC module configured to receive wireless configuration information and IP address configuration information from a mobile device, a controller configured to control the NFC module to receive the wireless configuration information and the IP address configuration information from the mobile device when the mobile device is tagged by the image forming apparatus, an authentication unit configured to perform user authentication of a user of the mobile device with respect to the image forming apparatus, and a wireless communication module configured to establish communication with an access point (AP), wherein the controller is further configured to control the wireless communication module establish communication with the AP based on the wireless configuration information and to control the wireless communication module assign an IP address based on the received IP address configuration information.

The controller may be further configured to control the wireless communication module to assign the IP address by the AP according to a method of IP addressing associated with the IP address configuration information or to be assigned the IP address included in the IP address configuration information when the wireless communication module is assigned the IP address.

The wireless configuration information and the IP address configuration information may be input to the mobile device via a user interface of the mobile device.

The wireless configuration information may be generated when the mobile device is connected to the AP.

The controller may be further configured to control the NFC module not to request transmission or receipt of information to or from the mobile device and according to a request of the mobile device, the NFC module may be controlled to receive and store the wireless configuration information and the IP address configuration information or to read out information stored in the image forming apparatus.

The controller may be further configured to control the NFC module to receive user authentication information from the mobile device and the authentication unit may be further configured to compare the authentication information stored in advance in at least one selected from the image forming apparatus and a server connected to the image forming apparatus with the received user authentication information.

The controller may be further configured to control the wireless communication module such that, if the authentication fails, the image forming apparatus does not establish communication with the AP.

In accordance with another aspect of the present disclosure, an image forming system is provided. The image forming system includes a mobile device configured to receive wireless configuration information and IP address configuration information from a user, and when the mobile device is tagged by an image forming apparatus, the mobile device is further configured to transmit the received wireless configuration information and the IP address configuration information to the image forming apparatus, and an image forming apparatus configured to receive the wireless configuration information and the IP address configuration information from the mobile device when the mobile device is tagged by the image forming apparatus, to perform user authentication of the user with respect to the image forming apparatus, to establish communication with an AP using the wireless configuration information, and to be assigned an IP address according to the IP address configuration information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that the terms such as "formed of," "include," and "comprise" do not necessarily include all stated components. Some of the stated components may not be included, or additional components may be further included. Expressions such as "at least one of," when preceding a list of elements, modify the entire list of elements and do not modify the individual elements of the list.

Figure 1:
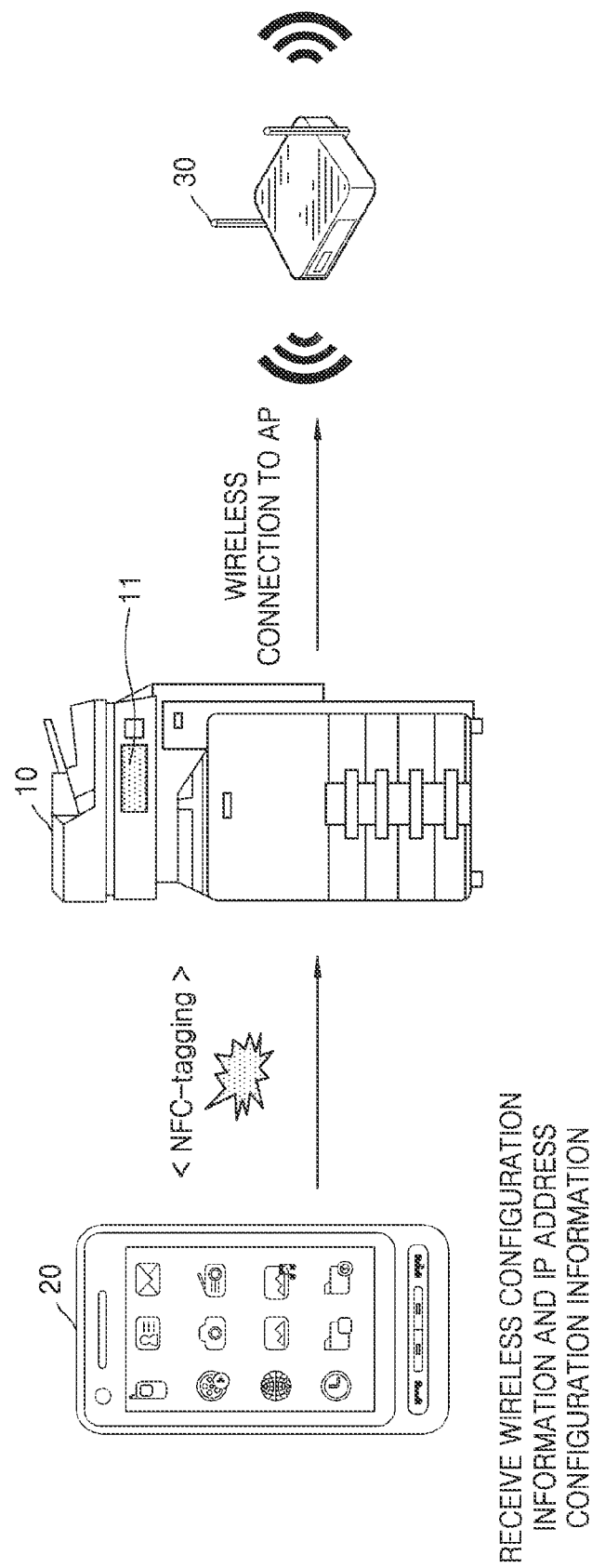
FIG. 1 illustrates a wireless communication environment of an image forming apparatus according to an embodiment of the present disclosure.

FIG. 1 illustrates a wireless communication environment of an image forming apparatus 10 according to an embodiment of the present disclosure.

Referring to FIG. 1, the image forming apparatus 10 includes a near field communication (NFC) chip 11 that enables communication with a mobile device 20 by using NFC function. The mobile device 20 may be any electronic device configured to communicate over a network such as a smartphone, a tablet device, or a personal digital assistant (PDA).

When the mobile device 20 includes a NFC communication device and comes into geographic proximity of the image forming device 10, the image forming apparatus 10 may detect the mobile device 20. For example, the mobile device 20 may include an NFC module or tag and the image forming device 10 may detect the NFC module or the tag of the mobile device 20 where information may be exchanged between the mobile device 20 and the image forming apparatus 10 using an NFC function. Or when the mobile device 20 includes the NFC communication device and comes into geographic proximity of the image forming device 10, the mobile device 20 transmits a command to the image forming device 10. For example, the image forming device 10 includes NFC module or the tag and the mobile device 20 may transmit a command to the NFC module or the tag of the image forming apparatus 10 where information may be exchanged between the image forming apparatus 10 and the mobile device 20 using an NFC function.

Moreover, the image forming apparatus 10 further includes a Wi-Fi module configured to establish wireless communication with an access point (AP) 30. AP 30 may be any device configured to facilitate communications with a communication network and may include any type of access point such as a macro access point, a micro access point, a femto access point, etc. In an exemplary embodiment, image forming apparatus 10 interfaces with the communication network via AP 30.

Before performing wireless communication with the AP 30, a wireless connection is established between the image forming apparatus 10 and the AP 30. In an exemplary embodiment, the image forming apparatus 10 performs an AP discovery process, an authentication process with respect to the discovered AP, and an association process with respect to a wireless network including the discovered AP. A wireless connection between the image forming apparatus 10 and the AP 30 is established when the association process is complete.

Moreover, in order to configure a wireless connection associated with the image forming apparatus 10, interaction with a user interface of the image forming apparatus is necessary. For example, a user inputs information associated with the wireless connection configuration using the interface. However, a user interface of the image forming apparatus 10 may be undesirably difficult for the user to manipulate because the user interface may be a keypad. Even if the user interface is a touchscreen, a menu displayed on the screen may be difficult to navigate. Accordingly, the user may have difficulties in establishing a wireless connection between the image forming apparatus 10 and an AP due to a complicated user interface associated with the image forming apparatus 10.

However, the image forming apparatus 10 according to an embodiment of the present disclosure may receive information about a wireless connection configuration from the mobile device 20 by using the NFC function. The image forming apparatus 10 may establish a wireless connection with the AP 30 based on the received information about the wireless connection configuration.

In an exemplary embodiment, the image forming apparatus 10 receives wireless configuration information and internet protocol (IP) address configuration information from the mobile device 20. Based on the received wireless configuration information, the image forming apparatus 10 may establish a wireless connection with an AP using the received wireless configuration information. In addition, the image forming apparatus 10 may be assigned an IP address using the IP address configuration information.

The wireless configuration information includes any information necessary to establish a wireless connection between the image formation device 10 and an AP. For example, the wireless configuration information may include a service set identifier (SSID) of the AP, channel information, security information, encryption type information, authentication type information, wired equivalent privacy (WEP) information, Wi-Fi protected access (WPA) information, etc. The IP address configuration information includes any information necessary to acquire an IP address. For example, the IP address configuration information may include information regarding a method of IP addressing such as a dynamic host configuration protocol (DHCP) method or a static method, IP address information, information about a subnet mask and a gateway, etc.

It is noted that FIG. 1 illustrates image formation device 10 communicating with a single AP 30. However, one of ordinary skill in the art would recognize that image formation device 10 may establish communication with two or more different APs.

Accordingly, a wireless connection may be established between the image forming apparatus 10 and the AP 30 based on information communicated from the mobile device 20 to the image forming device 10 using NFC technology.

Figure 2:
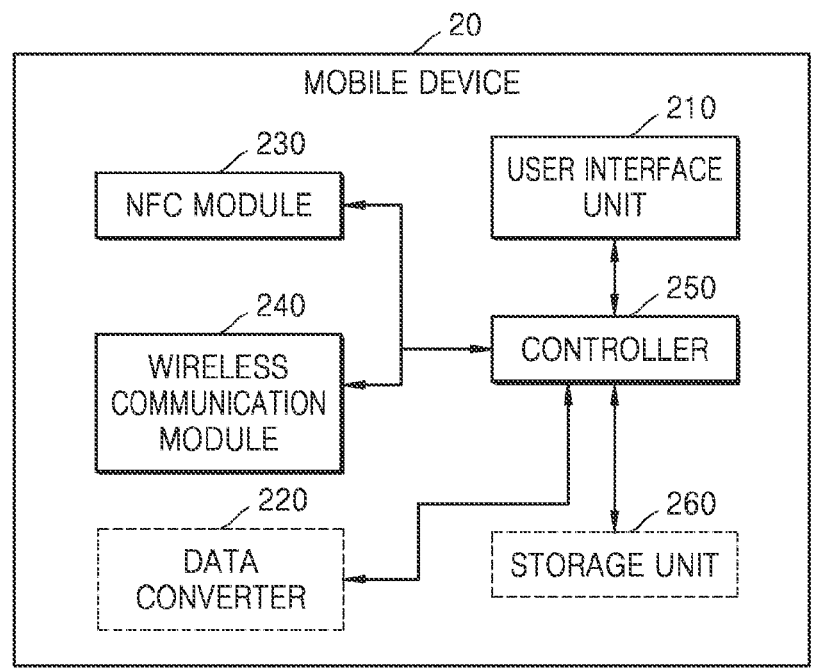
FIG. 2 illustrates a block diagram of a mobile device according to an embodiment of the present disclosure.

FIG. 2 illustrates a block diagram of a mobile device according to an embodiment of the present disclosure.

Referring to FIG. 2, the mobile device 20 is configured to receive wireless configuration information, IP address configuration information, and user authentication information. The mobile device 20 may receive the wireless configuration information, IP address configuration information, and the user authentication information through various techniques. For example, a user may input information associated with the wireless configuration information, the IP address configuration information, and/or the user authentication information at the user interface unit 210. The wireless configuration information, the IP address configuration information, and/or the user authentication information may also be transmitted to the mobile device 20 from another electronic device or a combination thereof.

After the mobile device 20 receives the wireless configuration information, IP address configuration information, and the user authentication information, the mobile device 20 converts the wireless configuration information, IP address configuration information, and user authentication information into a NFC compatible format. For example, the wireless configuration information, IP address configuration information, and the user authentication information may be converted into NFC data exchange format (NDEF) information.

The user authentication information includes user authentication information associated with the image forming apparatus 10. For example, the user authentication information may include a user identification (ID) for identifying a user and a password for user authentication.

After the mobile device 20 is geographically located near the image forming apparatus 10 and the image forming apparatus 10 initiates NFC communication with the mobile device 20, the mobile device 20 transmits the NDEF data to the image forming apparatus 10. The image forming apparatus 10 performs user authentication by using user authentication information included in the NDEF data. The image forming apparatus 10 performs user authentication, and if the authentication succeeds, the image forming apparatus 10 establishes a wireless connection with an AP based on the wireless configuration information included in the NDEF data received from the mobile device 20. In addition, the image forming apparatus 10 may be assigned an IP address based on the IP address configuration information included in the received NDEF data.

Referring to FIG. 2, the mobile device 20 includes a user interface unit 210, a data converter 220, an NFC module 230, a wireless communication module 240, and a controller 250. Also, the mobile device 20 may further include a storage unit 260.

The user interface unit 210 is configured to display a screen or interface to a user and receive an input from the user. The user may visually identify information associated with the mobile device 20 and may input commands to the mobile device 20 via the user interface unit 210.

In an exemplary embodiment, the user interface unit 210 may receive a user input including wireless configuration information and IP address configuration information from the user. For example, a list of one or more APs identified during a discovery procedure may be displayed on the user interface unit 210. The user may select any one of the APs listed at the user interface unit 210. After an indication associated with a selection of an AP is received, an authentication interface associated with the selected AP may be displayed on the user interface unit 210. For example, the authentication interface may request a password associated with the selected AP and security information related to the AP associated with establishing a connection between the image forming apparatus 10 and the selected AP.

In addition, the authentication interface displayed at the user interface unit 210 may further include a request for user authentication information for performing user authentication. For example, the user authentication information may include a user ID and/or a password associated with authenticating communication between the mobile device 20 and the image forming apparatus 10.

The data converter 220 converts the wireless configuration information and IP address configuration information to NDEF data. In addition, the data converter 220 may convert the user authentication information to NDEF data.

The NFC module 230 communicates with an external device by using the NFC function. For example, when the mobile device 20 is tagged by the image forming apparatus 10, the NFC module 230 may transmit the NDEF data to the image forming apparatus 10. In an exemplary embodiment, when the mobile device 20 is tagged by the image forming apparatus 10, the NFC module 230 may transmit an NFC command to the image forming apparatus 10. The NFC command may include a command indicating that the mobile device 20 transmits information related to the mobile device 20 to the image forming apparatus 10 where the image forming apparatus 10 may store the information related to the mobile device 20.

The wireless communication module 240 is configured to establish wireless communication with an external device. For example, the wireless communication module 240 may establish communication with an AP via a wireless local area network (LAN) interface.

The controller 250 may control each element included in the mobile device 20. In the case that the mobile device 20 is tagged by the image forming apparatus 10, the controller 250 may control the NFC module 230 to transmit the NDEF data to the image forming apparatus 10.

In an exemplary embodiment, when the user interface unit 210 receives an input associated with wireless configuration information, such as information associated with establishing a wireless connection to an AP, for example, information associated with a user selected AP from a list of identified APs, a password to access the AP, and a security configuration associated with the AP, and receives an input of IP address configuration information, such as a method of IP addressing and IP address information, the controller 250 may also control the wireless communication module 240 establish communication with the selected AP. After the wireless connection is established with the selected AP and the user interface unit 210 receives an input including user authentication information such as a user ID and a password, the controller 250 may also control the wireless communication module 240 to transmit the user authentication information to an external server so that authentication is performed and to receive an authentication result from the external server. The controller 250 may control the storage unit 260 to store wireless configuration information, IP address configuration information, and user authentication information according to the received authentication result.

However, when the user interface unit 210 receives an input including user authentication information after the wireless connection to the selected AP is established, the controller 250 is not limited to controlling the wireless communication module 240 to transmit the user authentication information to the external server so that authentication is performed. Although the wireless communication module 240 is not wirelessly connected to an AP, the controller 250 may control the wireless communication module 240 to be connected to a mobile network. When the user interface unit 210 receives an input including user authentication information after a wireless connection to the mobile network is established, the controller 250 may control the wireless communication module 240 to transmit the user authentication information to an external server so that authentication is performed and to receive an authentication result from the external server. The controller 250 may control the user interface unit 210 to receive an input including wireless configuration information and IP address configuration information according to the received authentication result.

Also, the controller 250 may control the data converter 220 to convert wireless configuration information, IP address configuration information, and user authentication information used for establishing a wireless connection with an AP to NDEF data and the storage unit 260 to store the NDEF data.

Moreover, the storage unit 260 may store a variety of information about the mobile device 20. The storage unit 260 may store wireless configuration information, IP address configuration information, and user authentication information. Also, the storage unit 260 may store NDEF data obtained by converting the wireless configuration information, IP address configuration information, and user authentication information in the data converter 220.

Figure 3:
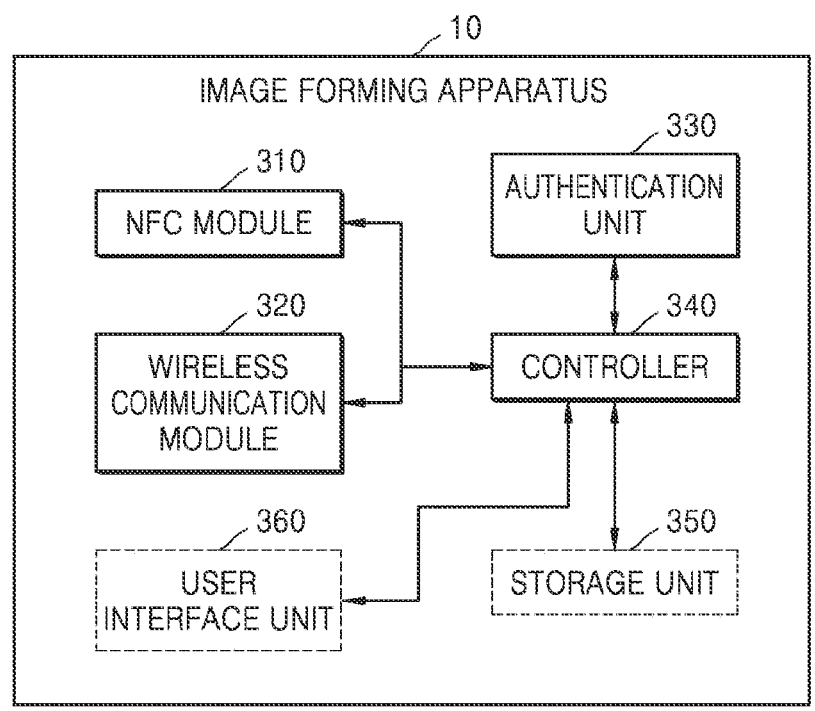
FIG. 3 illustrates a block diagram an image forming apparatus according to an embodiment of the present disclosure.

FIG. 3 illustrates a block diagram of an image forming apparatus according to an embodiment of the present disclosure.

Referring to FIG. 3, the image forming apparatus 10 may include an NFC module 310, a wireless communication module 320, an authentication unit 330, and a controller 340. Also, the image forming apparatus 10 may further include a storage unit 350 and/or a user interface unit 360.

When the mobile device 20 is tagged by the image forming apparatus 10, the image forming apparatus 10 according to an embodiment may receive wireless configuration information, IP address configuration information, and user authentication information from the mobile device 20 and may perform user authentication of a user of the mobile device 20 with respect to the image forming apparatus 10 based on the received user authentication information. If the user authentication succeeds, the image forming apparatus 10 may establish communication with an AP using the wireless configuration information. Also, the image forming apparatus 10 may be assigned an IP address based on the IP address configuration information.

Referring to FIG. 3, the NFC module 310 communicates with an external device by using NFC function.

When the mobile device 20 is tagged by the image forming apparatus 10 using the NFC module 310, the NFC module 310 may receive an NFC command from the mobile device 20 via NFC. The NFC command may include information regarding a function to be performed via NFC.

When the mobile device 20 is tagged by the image forming apparatus 10, the NFC module 310 may also receive wireless configuration information, IP address configuration information, and user authentication information from the mobile device 20 via NFC. For example, when the mobile device 20 is tagged by the image forming apparatus 10, the NFC module 310 may receive NDEF data including wireless configuration information, IP address configuration information, and user authentication information from the mobile device 20 via NFC.

The wireless communication module 320 is configured to wirelessly communicate with an external device. In particular, via a wireless LAN interface, the wireless communication module 320 may be connected to an AP and thus may communicate with the AP wirelessly.

The authentication unit 330 performs user authentication using the user authentication information received from the mobile device 20 by the NFC module 310. For example, the authentication unit 330 may perform authentication by comparing information related to authentication that is stored in at least one of the image forming apparatus 10 and an external server connected to the image forming apparatus 10 with user authentication information. The information related to authentication may include a user ID and a password.

For example, when a user ID and a password that are received from the mobile device 20 and a user ID and a password that are registered in the image forming apparatus 10 are compared with each other and are determined to be identical, successful user authentication may be determined. Alternatively, when a user ID and a password that are received from the mobile device 20 and a user ID and a password that are registered in an external server are compared with each other and are determined to be identical, successful user authentication may be determined. For example, when the image forming apparatus 10 transmits a user ID and a password included in the received NDEF data from the mobile device 20 to an external authentication server and requests authentication, the external authentication server compares a user ID and a password that are registered in an external server with the user ID and the password that are included in the received NDEF data. When the compared user IDs and passwords are determined to be identical, authentication may be determined as a success. After authentication, the external server transmits an authentication result to the image forming apparatus 10 and the image forming apparatus 10 may determine success or failure of authentication based on the received authentication result.

Alternatively, when user authentication is performed at the image forming apparatus 10, the information related to user authentication may be configured and stored in the image forming apparatus 10 in advance by an administrator or a user. In addition, if user authentication is performed via an external authentication server, an administrator or a user may access an external server using an electronic device and thus may register the information related to user authentication in the external server in advance.

The controller 340 may control each element included in the image forming apparatus 10. When the mobile device 20 is tagged by the image forming apparatus 10, the controller 340 may determine, based on a received NFC command, if the mobile device 20 is an NFC reader or an NFC writer. The NFC reader is an apparatus for reading information from an NFC tag via NFC and the NFC writer is an apparatus for transmitting information to an NFC tag via NFC so that the information may be recorded on the NFC tag. The controller 340 may determine whether to receive wireless configuration information, IP address configuration information, and user authentication information depending on whether the mobile device 20 is the NFC reader or the NFC writer.

For example, in the case that the NFC command includes a command that indicates transmitting information related to the mobile device 20 to the image forming apparatus 10 so that the information related to the mobile device 20 may be recorded on an NFC tag included in the image forming apparatus 10, the image forming apparatus 10 may determine the mobile device 20 as the NFC writer and may receive wireless configuration information, IP address configuration information, and user authentication information from the mobile device 20.

The controller 340 may control the wireless communication module 320 to establish communications with an AP using the wireless configuration information received from the mobile device 20. The controller 340 may also control the wireless communication module 320 to be assigned an IP address of the image forming apparatus 10 based on the IP address configuration information received from the mobile device 20.

Moreover, the controller 340 may control the NFC module 310 such that the NFC module 310 may not request receipt or transmission of information to an external device. That is, the controller 340 may control the NFC module 310 not to transmit or receive information by sending a voluntary request to an external device. The controller 340 may control the NFC module 310 such that, by a request of the external device, the NFC module 310 may receive wireless configuration information, IP address configuration information, and user authentication information from the external device and store the wireless configuration information, IP address configuration information, and user authentication information. The controller 340 may also control the NFC module 310 such that information stored in the image forming apparatus 10 is read out by the external device by a request of the external device.

For example, the NFC module 310 may operate in card emulation mode, and in this case, the NFC module 310 may operate like a card (or an NFC tag). Accordingly, the NFC module 310 may store or transmit information only in response to a request of an external device. In the case that the NFC module 310 receives a command that indicates transmitting information to the image forming apparatus 10 so that information related to the mobile device 20 is stored in the image forming apparatus 10 based on a request of the mobile device 20, the controller 340 may control the NFC module 310 to receive and store wireless configuration information, IP address configuration information, and user authentication information.

Moreover, if the authentication unit 330 fails to authenticate, the controller 340 may control the wireless communication module not to establish communications with an AP. Also, if the authentication unit 330 fails to authenticate, the controller 340 may control the user interface unit 360 to display a message that notifies failure of authentication.

The controller 340 may also control the wireless communication module 320 such that, when an IP address is assigned, the IP address is assigned from an AP according to a method of IP addressing, which is defined in IP address configuration information, or is assigned an IP address included in IP address configuration information.

Moreover, the storage unit 350 may store the wireless configuration information, IP address configuration information, and user authentication information received from the NFC module 310. The storage unit 350 may store information related to authentication that is defined in advance by a user or an administrator.

The user interface unit 360 may display a message. Also, the user may recognize information about the image forming apparatus 10 via the user interface unit 360 and may input command to the image forming apparatus 10 via the user interface unit 360. The user or the administrator may configure information related to authentication in advance by manipulating the user interface unit 360.

Although not illustrated in FIG. 3, the image forming apparatus 10 may also include other wireless communication modules such as a bluetooth (BT) module, a Zigbee module, etc.

Figure 4A:
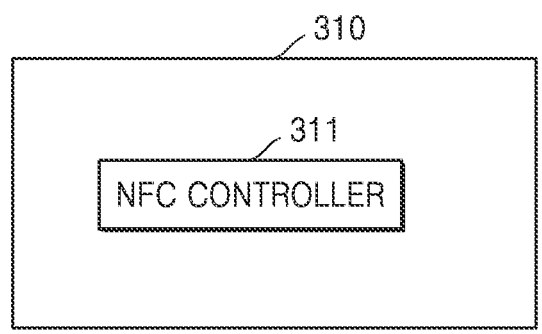
FIG. 4A illustrates an exemplary NFC module of an image forming apparatus according to an embodiment of the present disclosure.

FIG. 4A illustrates an exemplary NFC module of the image forming apparatus according to an embodiment of the present disclosure.

Referring to FIG. 4A, the NFC module 310 of the image forming apparatus 10 may include an NFC controller chip 311. The NFC controller chip 311 may receive information from the mobile device 20 through an NFC antenna or may transmit information to the mobile device 20 through an NFC antenna. For example, the NFC controller chip 311 may communicate with the mobile device 20 bilaterally via NFC. In addition, the NFC module 310 including the NFC controller chip 311 may operate in peer-to-peer (P2P) mode, reader or writer mode, or card emulation mode.

The P2P mode supports communication at the link level between two devices. An NFC client searches for an NFC host for connection establishment where the NFC client and the NFC host may transmit data to each other through NDEF messages. An NDEF refers to a data format that is used when devices exchange data in P2P mode via NFC or when a device brings data from an NFC tag via NFC. If NFC-compatible devices are within a close distance of each other, data may be transmitted at a constant speed via NFC. For example, information associated with applications such as email, calendar, contacts, etc., messages, schedules, phone numbers, or extensible markup language (XML) data may be transmitted using NFC.

The reader or writer mode is a mode that may be used in a terminal that includes an NFC controller chip. The terminal including the NFC controller chip may operate in an active mode and thus supports not only a function of a tag that stores information but also a function of a reader that reads information stored in an external tag and a function of a writer that records information on an external tag. The reader or writer mode refers to a mode that supports the terminal including the NFC controller chip such that the terminal including the NFC controller chip operates as a reader that reads information stored in an external tag or a writer that records information on an external tag. For example, a user, by using the mobile device 20, may have a uniform resource locator (URL) address that is stored in an external tag, such as a smart poster, read by the mobile device 20 and thus may access a website of the address. The mobile device 20, or more specifically, the NFC module 230, may operate in an NFC reader mode.

Moreover, the card emulation mode is a mode that supports a device such that the device acts like a smart card (or an NFC tag). That is, when the device operates in a card emulation mode, an external NFC reader recognizes the device as a smart card.

The NFC module 310 including the NFC controller chip 311 according to an embodiment operates in card emulation mode and thus acts like a smart card (or an NFC tag). Then, an NFC reader or writer recognizes the image forming apparatus 10 as a smart card. In the case that the mobile device 20 operates as an NFC reader, the mobile device 20 may read information stored in the NFC module 310. In the case when the mobile device 20 operates as an NFC writer, the mobile device 20 may record information about the mobile device 20 onto the NFC module 310.

Figure 4B:
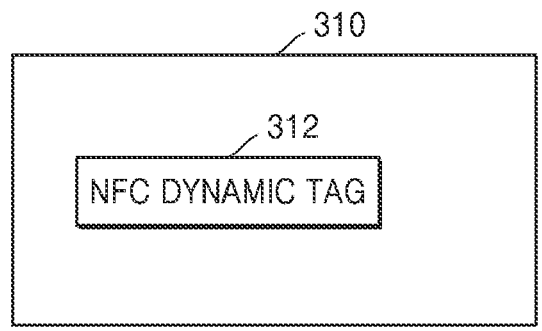
FIG. 4B illustrates an exemplary NFC module of an image forming apparatus according to an embodiment of the present disclosure.

FIG. 4B illustrates an NFC module according to an embodiment of the present disclosure.

Referring to FIG. 4B, the NFC module 310 includes a dynamic NFC tag 312 instead of the NFC controller chip 311 as illustrated in FIG. 4A. The dynamic NFC tag 312 is a type of tag that may store information. An NFC reader may read information stored in the dynamic NFC tag 312 or an NFC writer may record information on the dynamic NFC tag 312. Although the dynamic NFC tag 312 is the same as a general NFC tag in that the dynamic NFC tag 312 may store information, the dynamic NFC tag 312 is different from a general NFC tag in that the information stored in the dynamic NFC tag 312 may be read out by the image forming apparatus 10 or the image forming apparatus 10 may record information on the dynamic NFC tag 312. For example, the dynamic NFC tag 312 may be connected to a mainboard of the image forming apparatus 10 to communicate with the mainboard of the image forming apparatus 10 embedded with a main controller.

Figure 5:
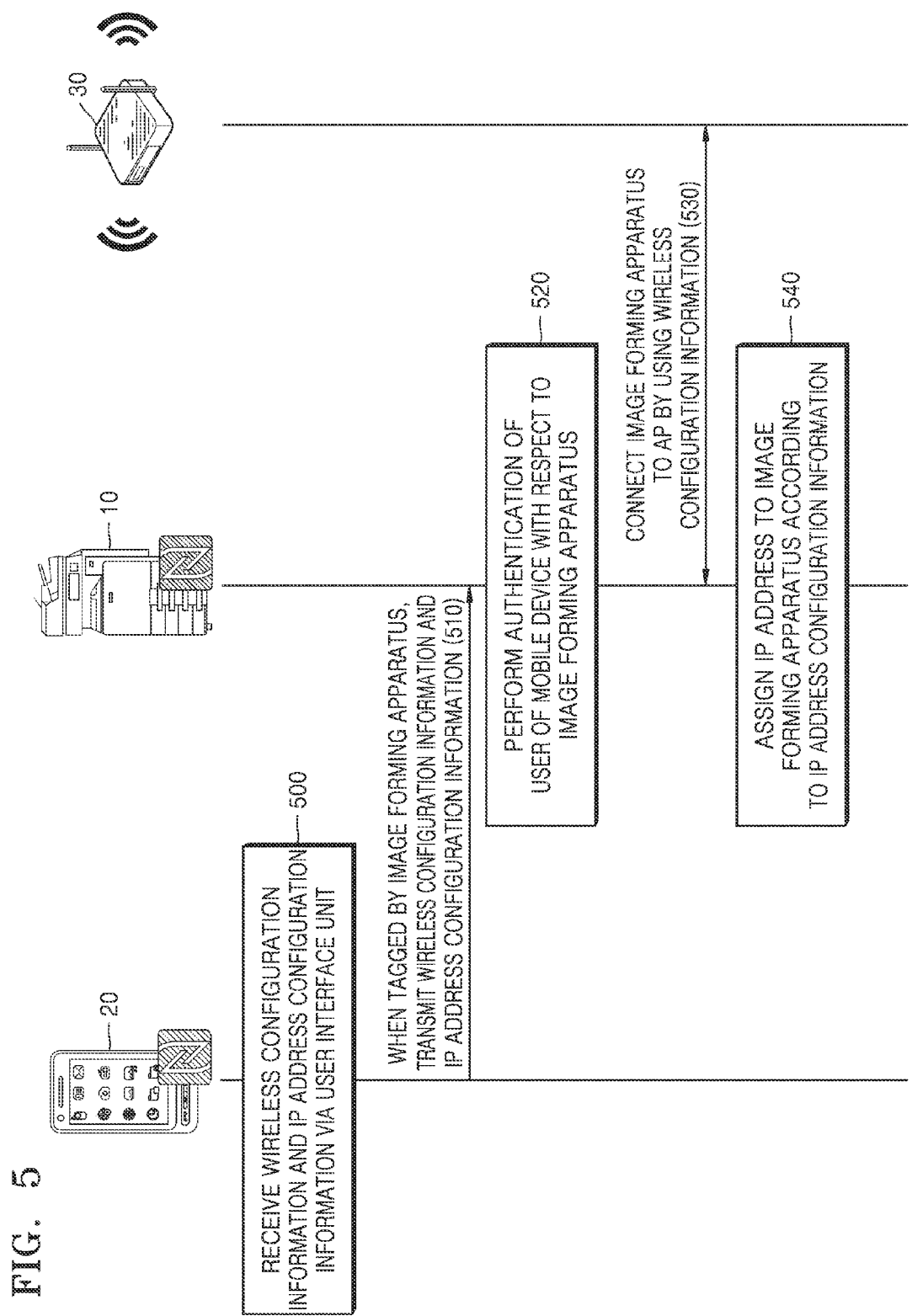
FIG. 5 illustrates a flowchart of a method of establishing communication between an image forming apparatus and an access point (AP) according to an embodiment of the present disclosure.

FIG. 5 is a flowchart of a method of establishing communication between an image forming apparatus and an AP according to an embodiment of the present disclosure.

In operation 500, the mobile device 20 may receive wireless configuration information and IP address configuration information via a user interface unit of the mobile device 20. Also, the mobile device 20 may further receive user authentication information. For example, a user inputs wireless configuration information, IP address configuration information, and user authentication information that are necessary to connect the image forming apparatus 10 to an AP by using the mobile device 20 to the mobile device 20 via a user interface unit of the mobile device 20.

In operation 510, when the mobile device 20 is tagged by the image forming apparatus 10, the mobile device 20 may transmit the wireless configuration information and the IP address configuration information to the image forming apparatus 10. Also, the mobile device 20 may further transmit the user authentication information to the image forming apparatus 10.

In operation 520, the image forming apparatus 10 performs user authentication of user with respect to an image forming apparatus. The image forming apparatus 10 may perform the user authentication of user with respect to an image forming apparatus using the user authentication information received from the mobile device 20.

In operation 530, if the image forming apparatus 10 succeeds in authenticating the user with respect to an image forming apparatus, the image forming apparatus 10 may establish communication with the AP 30 using the wireless configuration information received from the mobile device 20. For example, the image forming apparatus 10 may receive, from the mobile device 20, information such as information about an AP, a password for the AP, and an encryption method of the AP that are input in advance to the mobile device 20 in order to establish communication between the image forming apparatus 10 and the AP based on the information.

In operation 540, the image forming apparatus 10 may be assigned an IP address according to the IP address configuration information received from the mobile device 20. In detail, the image forming apparatus 10 may be assigned an IP address according to a method of IP addressing included in the received IP address configuration information. Moreover, in the case that the method of IP addressing is static, the image forming apparatus 10 may be directly assigned an IP address included in IP address configuration information.

Figure 6:
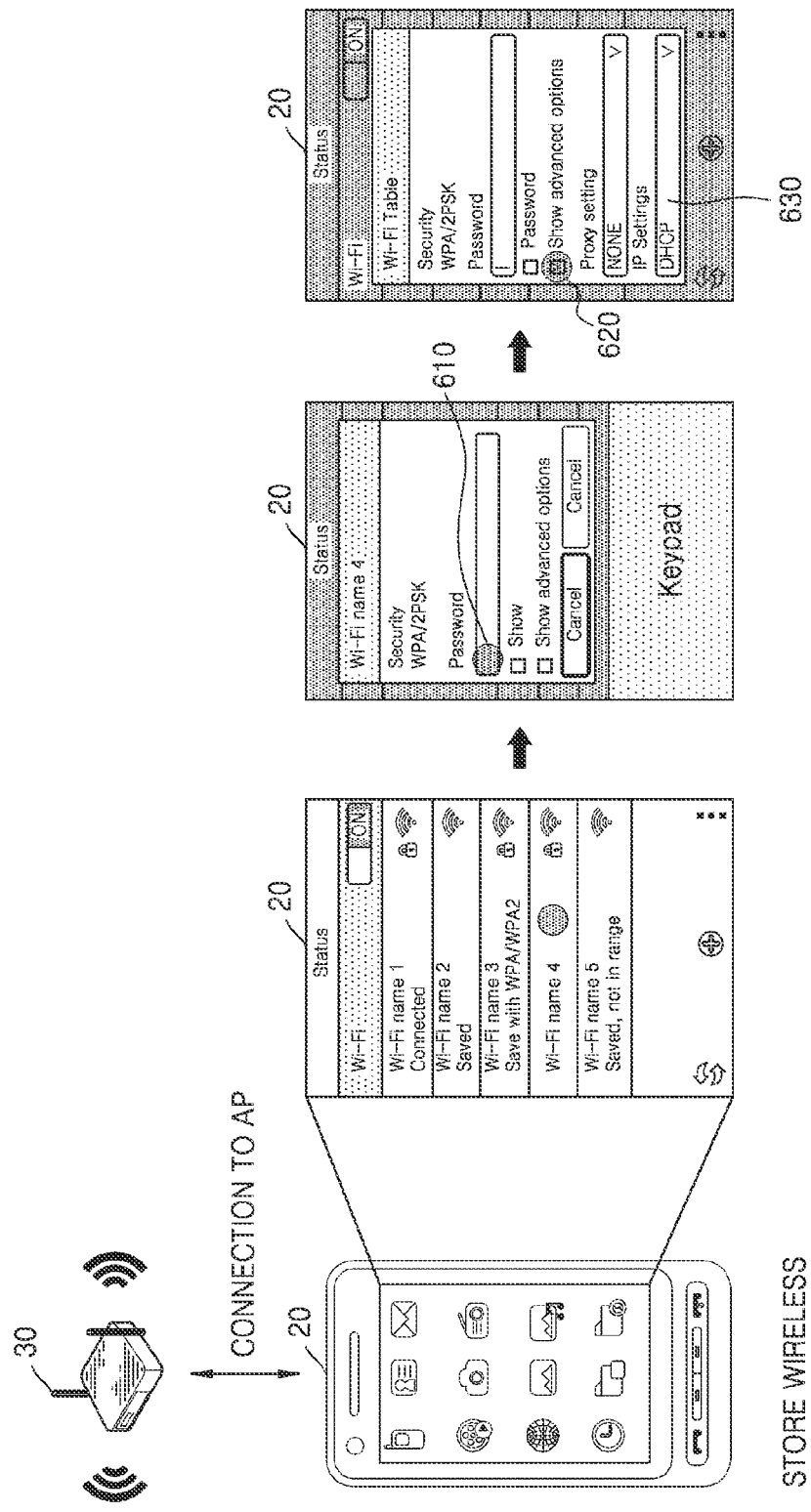
FIG. 6 illustrates a process associated with a mobile device according to an embodiment of the present disclosure.

FIG. 6 illustrates a process associated with a mobile device according to an embodiment of the present disclosure.

Referring to FIG. 6, the user executes a wireless configuration application for an image forming apparatus 10 on the mobile device 20. The user searches for an AP to be connected to the image forming apparatus 10 using the mobile device 20 and then selects the AP. For example, as shown in FIG. 6, the user may select an AP 30 that has 'Wi-Fi name 4' as an SSID thereof from among APs around the mobile device 20 that are discovered by using the mobile device 20.

If a security function is configured on an AP that the user wants to connect the image forming apparatus to, the user may use the mobile device 20 to additionally input credential information such as a password for wireless connection. For example, the user uses the mobile device 20 to input a password 610 that is associated with the discovered AP in advance.

In addition, the user may additionally choose a check button 620 and configure an advanced option. For example, the user may choose a method 630 of IP addressing to be configured in the image forming apparatus 10. For example, the user may use the mobile device 20 to identify a DHCP method or a static method as a method of IP addressing. The DHCP method refers to a method by which a DHCP server selects an IP address from a list in the DHCP server and assigns the IP address. On the contrary, the static method refers to a method of assigning an IP address directly.

If the user selects the static method as the method of IP addressing, the user may additionally input an IP address, a subnet mask, and a gateway that are to be configured at the image forming apparatus 10.

When the user does not choose the check button 620 and configure an advanced option, the method of IP addressing may be determined to be the DHCP method.

After the information associated with the wireless configuration information, the IP address configuration information, and the user authentication information in input at the mobile device 20, the mobile device 20 attempts to establish communication with an AP 30. When the mobile device 20 is connected to the AP 30, the mobile device 20 may store input information associated with the user. The input formation associated with the user that is stored in the mobile device 20 includes wireless configuration information and IP address configuration information. Moreover, the mobile device 20 may convert the input information of the user to NDEF data and store the NDEF data.

Figure 7:
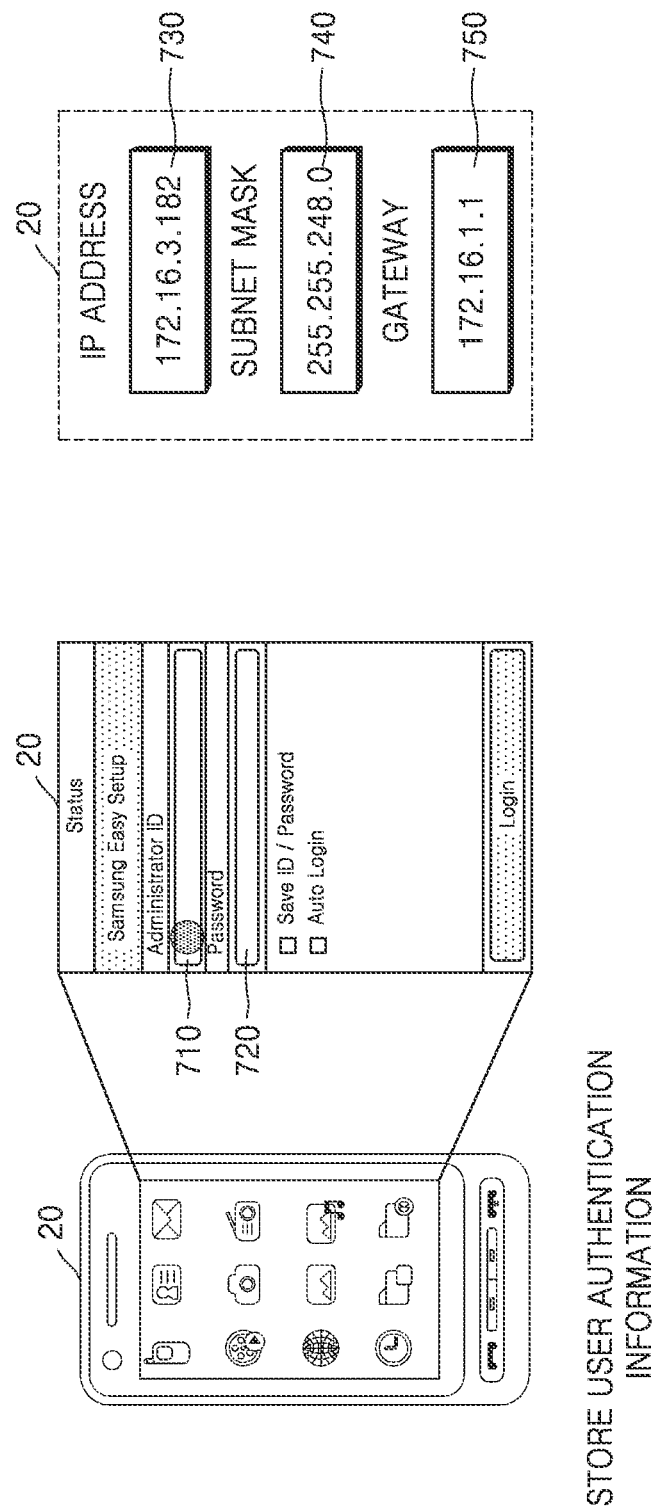
FIG. 7 illustrates a process associated with a mobile device according to an embodiment of the present disclosure.

FIG. 7 illustrates a process associated with a mobile device according to an embodiment of the present disclosure.

Referring to FIG. 7, the user uses the mobile device 20 to input user authentication information regarding the image forming apparatus 10. For example, the user may use the mobile device 20 to input a user ID 710 and a password 720. The mobile device 20 may transmit user authentication information to the image forming apparatus 10 so that user authentication of the user with respect to the image forming apparatus 10 is performed, and if the user authentication in the image forming apparatus 10 is successful, the mobile device 20 may receive an authentication result and store the user authentication information. Alternatively, the mobile device 20 may transmit user authentication information to an external server so that user authentication with respect to the image forming apparatus 10 is performed, and if the user authentication in the external server is successful, the mobile device 20 may store the user authentication information, according to an authentication result. Moreover, the mobile device 20 may convert user authentication information to NDEF data and store the NDEF data.

Moreover, the mobile device 20 is not limited to storing user authentication information when authentication succeeds. If the mobile device 20 receives user authentication information from the user, the mobile device 20 may store the user authentication information regardless of an authentication result. When the user authentication information is later transmitted to the image forming apparatus 10 via NFC, the image forming apparatus 10 may use the user authentication information to perform user authentication of the user.

The mobile device 20 may receive an input of wireless configuration information and IP address configuration information first. After the mobile device 20 is connected to an AP using the input wireless configuration information and IP address configuration information, the mobile device 20 may receive an input of user authentication information. Alternatively, the mobile device 20 may receive an input of user authentication information from the user first. User authentication may be attempted by using the user authentication information and if the authentication succeeds, the mobile device 20 may receive an input of wireless configuration information and IP address configuration information thereafter as shown in FIG. 6 and may be connected to the AP 30 by using the wireless configuration information and IP address configuration information.

In an exemplary embodiment, IP address configuration information may include an IP address 730, a subnet mask 740, and a gateway 750 as illustrated in FIG. 7.

Figure 8:
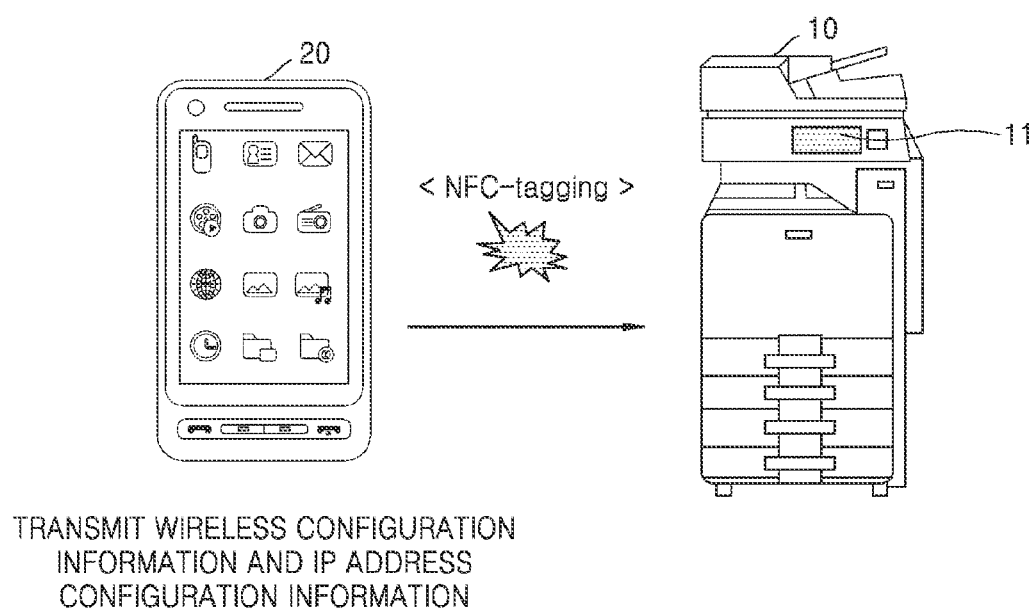
FIG. 8 illustrates a process of transmitting information according to an embodiment of the present disclosure.

FIG. 8 illustrates a process of transmitting information according to an embodiment of the present disclosure.

Referring to FIG. 8, when the mobile device 20 is tagged by the image forming apparatus 10, the mobile device 20 may transmit wireless configuration information and IP address configuration information to the image forming apparatus 10 using an NFC interface 11.

The mobile device 20 is not limited to transmitting wireless configuration information and IP address configuration information, and may also transmit user authentication information along with the wireless configuration information and the IP address configuration information to the image forming apparatus 10.

Figure 9:
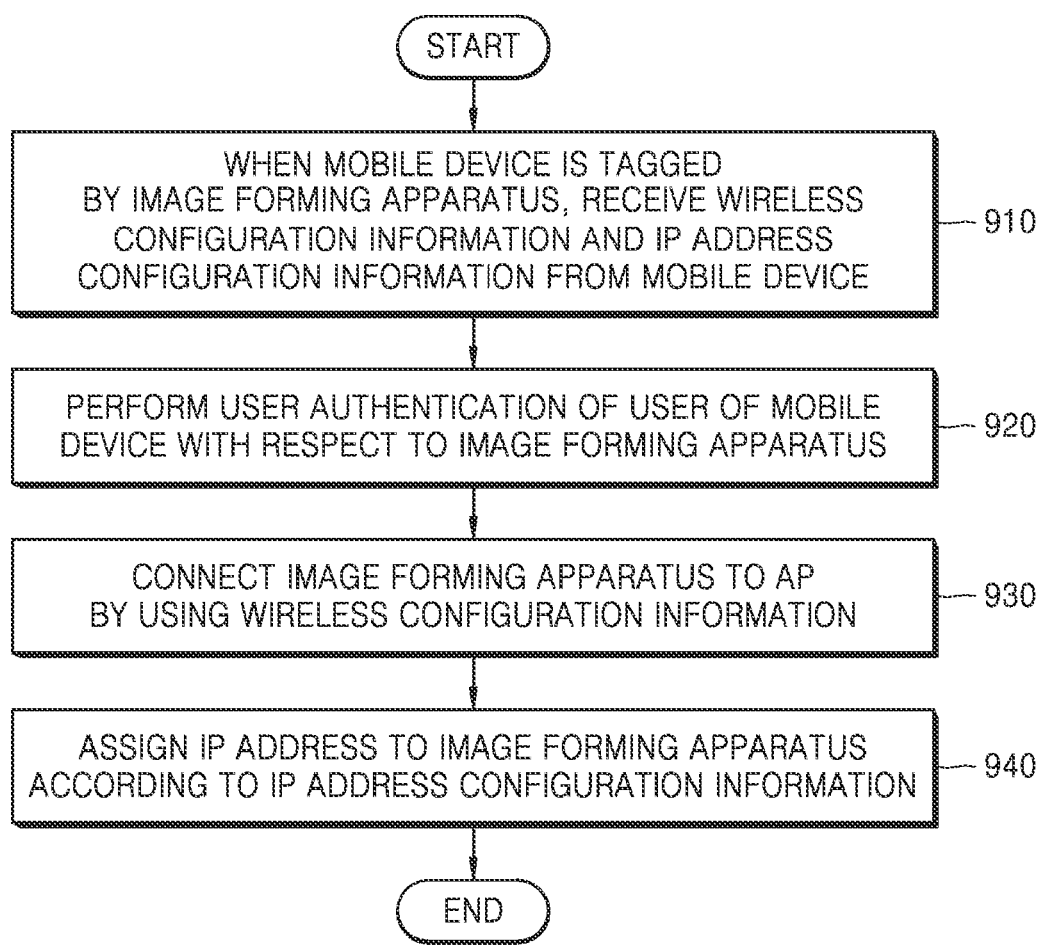
FIG. 9 illustrates a flowchart of a method according to an embodiment of the present disclosure.

FIG. 9 is a flowchart of a method according to an embodiment of the present disclosure.

Referring to FIG. 9, in operation 910, when the mobile device 20 is tagged by the image forming apparatus 10, the image forming apparatus 10 may receive wireless configuration information and IP address configuration information from the mobile device 20. The image forming apparatus 10 may receive user authentication information along with the wireless configuration information and the IP address configuration information. The pieces of information received from the mobile device 20 may be data converted to NDEF data.

In operation 920, the image forming apparatus 10 may perform user authentication with respect to the image forming apparatus 10. For example, the image forming apparatus 10 may perform user authentication of user with respect to the image forming apparatus 10 using the user authentication information received from the mobile device 20.

In operation 930, the image forming apparatus 10 may establish communication with the AP 30 using the wireless configuration information received from the mobile device 20.

In operation 940, the image forming apparatus 10 may be assigned an IP address according to the IP address configuration information received from the mobile device 20.

Figure 10:
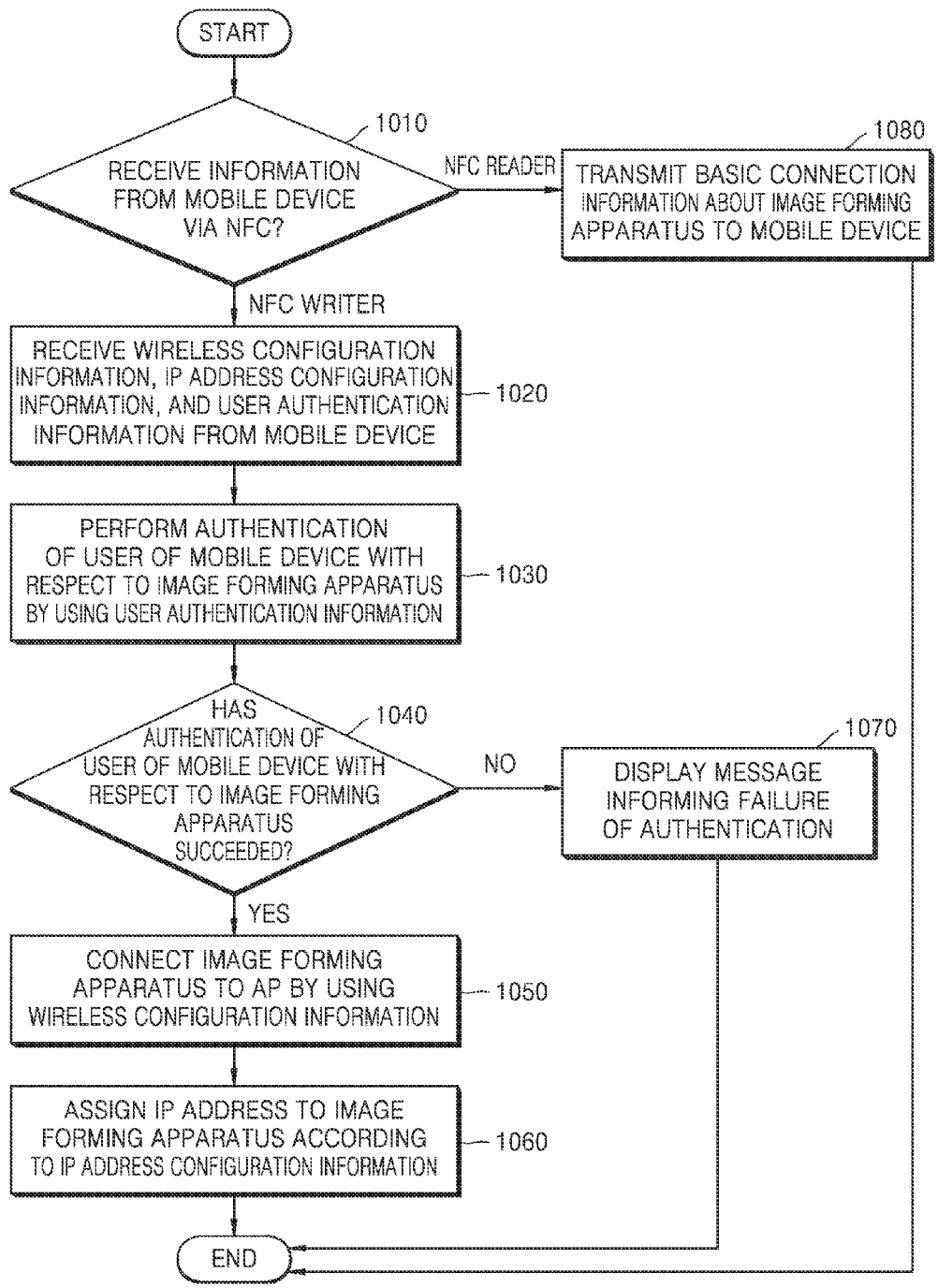
FIG. 10 illustrates a flowchart of a method according to an embodiment of the present disclosure.

FIG. 10 is a flowchart of a method according to an embodiment of the present disclosure.

If an NFC controller chip is used in the image forming apparatus 10, the image forming apparatus 10 controls the NFC controller chip via a built-in NFC software stack. The image forming apparatus 10 may operate by switching freely between an NFC card emulation mode, a P2P mode, and a reader or writer mode, and the image forming apparatus 10 according to the present embodiment may operate in the card emulation mode.

As the image forming apparatus 10 may operate in the card emulation mode, the user may easily establish a wireless connection between the mobile device 20 and the image forming apparatus 10. For example, if the image forming apparatus 10 operates in the P2P mode and the mobile device 20 uses the ANDROID operating system (OS), a P2P connection is established between the mobile device 20 and the image forming apparatus 10 via NFC. Here, the mobile device 20 displays an ANDROID beam screen on the display. The user may transmit wireless configuration information to the image forming apparatus 10 by additionally touching the ANDROID beam screen. However, it is inconvenient for the user to additionally touch the ANDROID beam screen. In the case that the image forming apparatus 10 operates in NFC reader mode, only if the mobile device 20 supports host-based card emulation function, the image forming apparatus 10 may receive wireless configuration information from the mobile device 20. However, there are few mobile devices 20 supporting the host-based card emulation function.

Accordingly, the image forming apparatus 10 according to an embodiment may operate in card emulation mode. In this case, as no ANDROID beam screen is displayed on the display, no additional input is needed. Further, regardless of whether the mobile device 20 supports the host-based card emulation function, a wireless connection between the mobile device 20 and the image forming apparatus 10 may be established by the tagging of the mobile device 20.

Moreover, the image forming apparatus 10 according to an embodiment may use a dynamic NFC tag. In the case that the image forming apparatus 10 uses the dynamic NFC tag, the image forming apparatus 10 may not operate either in NFC reader or writer mode or in P2P mode. Instead, as the dynamic NFC tag is connected to a main controller of the image forming apparatus 10 by a method of inter-integrated circuit (I2C) or universal asynchronous receiver/transmitter (UART), the main controller of the image forming apparatus 10 may record information on the dynamic NFC tag or may read information recorded on the dynamic NFC tag. The user may use such properties of the dynamic NFC tag to, by tagging of the mobile device 20, record wireless configuration information and IP address configuration information on the dynamic NFC tag and read wireless configuration information recorded on the dynamic NFC tag via the main controller of the image forming apparatus 10, thereby establishing the wireless connection between the mobile device 20 and the image forming apparatus 10.

In operation 1010, the image forming apparatus 10 detects whether the mobile device 20 is tagged by the image forming apparatus 10. If the image forming apparatus 10 detects that the mobile device 20 is tagged by the image forming apparatus 10, the image forming apparatus 10 determines whether the mobile device 20 is an NFC writer or an NFC reader based on an NFC command transmitted from the mobile device 20.

In detail, the image forming apparatus 10 determines whether the NFC command is a read command or an update command based on NFC command received from the mobile device 20. In the case where the image forming apparatus 10 receives the read command, the mobile device 20 may be determined as an NFC reader. In the case where the image forming apparatus 10 receives the update command, the mobile device 20 may be determined as an NFC writer. Moreover, the NFC command may vary with the NFC card emulation type. For example, when the image forming apparatus 10 supports type 4 tag of International Organization for Standardization (ISO)/International Electrotechnical Commission (IEC) 7816-4, a command list may be defined in ISO standard as follows.

TABLE 1

| Command name | INS code | Clause | INS code | Clause | Command name |
|---|---|---|---|---|---|
| ACTIVATE FILE | '44' | Part 9 | '04' | Part 9 | DEACTIVATE FILE |

TABLE 1-continued

| Command name | INS code | Clause | INS code | Clause | Command name |
|---|---|---|---|---|---|
| APPEND RECORD | 'E2' | 8.3.5 | '0E' | 8.2.4 | ERASE BINARY |
| CHANGE REFERENCE DATA | '24' | 8.5.6 | '10' | Part 7 | PERFORM SCQL OPERATION |
| CREATE FILE | 'E0' | Part 9 | '12' | Part 7 | PERFORM TRANSACTION OPERATION |
| DEACTIVATE FILE | '04' | Part 9 | '14' | Part 7 | PERFORM USER OPERATION |
| DELETE FILE | 'E4' | Part 9 | '20' | 8.5.8 | VERIFY |
| DISABLE VERIFICATION REQUIREMENT | '26' | 8.5.8 | '22' | 8.5.10 | MANAGE SECURITY ENVIRONMENT |
| ENABLE VERIFICATION REQUIREMENT | '28' | 8.5.7 | '24' | 8.5.6 | CHANGE REFERENCE DATA |
| ENVELOPE | 'C2' | 8.6.2 | '26' | 8.5.8 | DISABLE VERIFICATION REQUIREMENT |
| ERASE BINARY | '0E' | 8.2.4 | '28' | 8.5.7 | ENABLE VERIFICATION REQUIREMENT |
| EXTERNAL (/ MUTUAL) AUTHENTICATE | '82' | 8.5.3 | '2A' | Part 8 | PERFORM SECURITY OPERATION |
| GENERAL AUTHENTICATE | '86' | 8.5.4 | '2C' | 8.5.9 | RESET RETRY COUNTER |
| GENERATE PUBLIC-KEY PAIR | '46' | Part 8 | '44' | Part 9 | ACTIVATE FILE |
| GET CHALLENGE | '84' | 8.5.2 | '48' | Part 8 | GENERATE PUBLIC-KEY PAIR |
| GET DATA | 'CA' | 8.4.1 | '70' | 8.1.2 | MANAGE CHANNEL |
| GET RESPONSE | 'C0' | 8.6.1 | '82' | 8.5.3 | EXTERNAL (/ MUTUAL) AUTHENTICATE |
| INTERNAL AUTHENTICATE | '88' | 8.5.1 | '84' | 8.5.2 | GET CHALLENGE |
| MANAGE CHANNEL | '70' | 8.1.2 | '86' | 8.5.4 | GENERAL AUTHENTICATE |
| MANAGE SECURITY ENVIRONMENT | '22' | 8.5.10 | '88' | 8.5.1 | INTERNAL AUTHENTICATE |
| PERFORM SCQL OPERATION | '10' | Part 7 | 'A0' | 8.2.5 | SEARCH BINARY |
| PERFORM SECURITY OPERATION | '2A' | Part 8 | 'A2' | 8.3.5 | SEARCH RECORD |
| PERFORM TRANSACTION OPERATION | '12' | Part 7 | 'A4' | 8.1.1 | SELECT |
| PERFORM USER OPERATION | '14' | Part 7 | 'B0' | 8.2.1 | READ BINARY |
| PUT DATA | 'DA' | 8.4.2 | 'B2' | 8.3.1 | READ RECORD (S) |
| READ BINARY | 'B0' | 8.2.1 | 'C0' | 8.6.1 | GET RESPONSE |
| READ RECORD (S) | 'B2' | 8.3.1 | 'C2' | 8.6.2 | ENVELOPE |
| RESET RETRY COUNTER | '2C' | 8.5.9 | 'CA' | 8.4.1 | GET DATA |
| SEARCH BINARY | 'A0' | 8.2.5 | 'D0' | 8.2.2 | WRITE BINARY |
| SEARCH RECORD | 'A2' | 8.3.5 | 'D2' | 8.3.2 | WRITE RECORD |
| SELECT | 'A4' | 8.1.1 | 'D6' | 8.2.3 | UPDATE BINARY |
| TERMINATE CARD USAGE | 'FE' | Part 8 | 'DA' | 8.4.2 | PUT DATA |
| TERMINATE DF | 'E6' | Part 9 | 'DC' | 8.3.3 | UPDATE RECORD |
| TERMINATE EF | 'E8' | Part 9 | 'E0' | Part 9 | CREATE FILE |
| UPDATE BINARY | 'D6' | 8.2.3 | 'E2' | 8.3.4 | APPEND RECORD |
| UPDATE RECORD | 'DC' | 8.3.3 | 'E4' | Part 9 | DELETE FILE |
| VERIFY | '20' | 8.5.5 | 'E6' | Part 9 | TERMINATE DF |
| WRITE BINARY | 'D0' | 8.2.2 | 'E8' | Part 9 | TERMINATE EF |
| WRITE RECORD | 'D2' | 8.3.2 | 'FE' | Part 9 | TERMINATE CARD USAGE |

For every interindustry command, only the even INS code is present in the table; the odd INS code indicates BER-TLV coded data field(s).
The other valid INS codes are reserved for ISO/IEC JTC 1/SC 17.

Referring to Table 1, for example, when the image forming apparatus 10 receives NFC command having 'DA' as INS code from the mobile device 20, the image forming apparatus 10 may determine that the mobile device 20 is an NFC writer.

In operation 1020, if the image forming apparatus 10 determines that the mobile device 20 is an NFC writer, the image forming apparatus 10 may receive wireless configuration information, IP address configuration information, and user authentication information from the mobile device 20.

In operation 1030, the image forming apparatus 10 may perform user authentication of user with respect to an image forming apparatus using the user authentication information received from the mobile device 20.

In operation 1040, the image forming apparatus 10 may determine whether the user authentication has succeeded.

In operation 1050, if the user authentication has succeeded, the image forming apparatus 10 may establish communication with the AP 30 using the wireless configuration information received from the mobile device 20. That is, the image forming apparatus 10 may be connected to the AP 30 by using an SSID, a security method, and a password for AP that are included in the wireless configuration information.

In operation 1060, the image forming apparatus 10 may be assigned an IP address based on the IP address configuration information received from the mobile device 20.

In operation 1070, if the user authentication has failed, the image forming apparatus 10 displays a message that notifies failure of authentication on a user interface (UI) or the like of the image forming apparatus 10 and the image forming apparatus 10 does not establish communication with an AP.

In operation 1080, if the image forming apparatus 10 determines the mobile device 20 as an NFC reader, the image forming apparatus 10 may transmit basic connection information of the image forming apparatus 10 to the mobile device 20. In detail, in the case that the mobile device 20 operates as an NFC reader and thus transmits a read command to the image forming apparatus 10, the image forming apparatus 10 may determine that the mobile device 20 is an NFC reader and accordingly, may transmit basic connection information of the image forming apparatus 10 to the mobile device 20. For example, the image forming apparatus 10 may transmit already defined basic image forming apparatus information such as image forming apparatus connection information and/or application URL to the mobile device 20.

Figure 11:
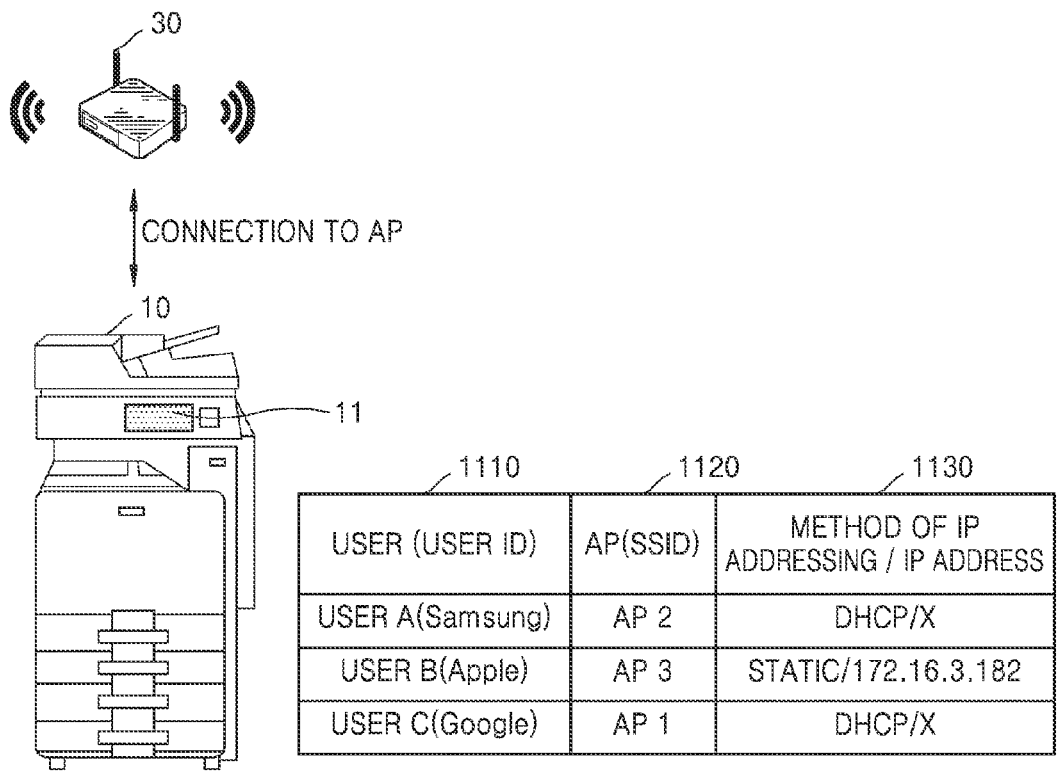
FIG. 11 illustrates a process of establishing communication according to an embodiment of the present disclosure.

FIG. 11 illustrates a process of establishing communication according to an embodiment of the present disclosure.

Referring to FIG. 11, when user authentication has succeeded, the image forming apparatus 10 may store wireless configuration information and IP address configuration information received from the mobile device 20. For example, the image forming apparatus 10 may store received wireless configuration information and IP address configuration information in the form of a table. The table may include a user field 1110, a wireless configuration field 1120, and an IP address configuration field 1130.

For example, if user A has the user's mobile device 20 tagged by the image forming apparatus 10, the image forming apparatus 10 first performs the user authentication associated with user A. If the user authentication succeeds, the image forming apparatus 10 may store 'USER A' in the user field 1110, 'AP 2' in the wireless configuration field 1120, and 'DHCP' in the IP address configuration field 1130 based on information received from the mobile device 20. If user B has the user's mobile device tagged by the image forming apparatus 10, the image forming apparatus 10 first performs the user authentication associated with user B. If the user authentication succeeds, the image forming apparatus 10 may store 'USER B' in the user field 1110, 'AP 3' in the wireless configuration field 1120, and 'STATIC/172.16.3.182' in the IP address configuration field 1130 based on information received from the mobile device. If user C has the user's mobile device tagged by the image forming apparatus 10, the image forming apparatus 10 performs user authentication associated with user C. If the user authentication succeeds, the image forming apparatus 10 may store 'USER C' in the user field 1110, 'AP 1' in the wireless configuration field 1120, and 'DHCP' in the IP address configuration field 1130 based on information received from the mobile device.

The image forming apparatus 10 is not limited to storing a user's name in the user field 1110 and may store a user's ID used to perform user authentication. For example, in the case of user A, 'SAMSUNG,' which is the user A's ID, may be stored in the user field 1110.

The image forming apparatus 10 may establish communication with the AP 30 based on the stored table.

Moreover, in the case that a user has the mobile device 20 tagged by the image forming apparatus 10, the image forming apparatus 10 may store information received from the mobile device 20 in a table and may attempt to connect to an AP by using the information received from the mobile device 20. If the image forming apparatus 10 fails to connect to the AP in spite of several connection attempts using information received from the mobile device 20, after a certain time, the image forming apparatus 10 may attempt to connect to the AP again using the stored information.

While the image forming apparatus 10 stores information received from the mobile device 20, the received information may be used to connect the image forming apparatus 10 to the AP 30 when a user who has the mobile device 20 tagged by the image forming apparatus 10 wants the image forming apparatus 10 to establish communication with the AP 30. In this regard, user authentication of the user of the mobile device 20 with respect to the image forming apparatus 10 is requested and the mobile device 20 is tagged by the image forming apparatus 10. When the user authentication succeeds, and the image forming apparatus 10 may establish communication with the AP 30 using information stored in a table.

The stored information is not limited to the user who has the mobile device 20 tagged by the image forming apparatus 10 and various users may access the stored information to connect the image forming apparatus 10 to an AP. In other words, the stored information is not limited to a specific user associated with the mobile device 20 tagged by the image forming apparatus 10 according to permission configured in the image forming apparatus 10 in advance and various users may use the stored information to connect the image forming apparatus 10 to the AP 30. For example, any authenticated user may access wireless configuration information and IP address configuration information stored by another authenticated user.

In the present embodiment, for convenience of description, only an SSID of the AP is stored in the wireless configuration field 1120. However, the present embodiment is not limited thereto and all the information associated with establishing communication between the image forming apparatus 10 and the AP may be stored in the wireless configuration field 1120. Also, in the present embodiment, only a method of IP addressing and an IP address are stored in the IP address configuration field 1130. However, the present embodiment is not limited thereto, and information about a subnet mask and a gateway may be stored in the IP address configuration field 1130 along with the method of IP addressing and the IP address.

Figure 12:
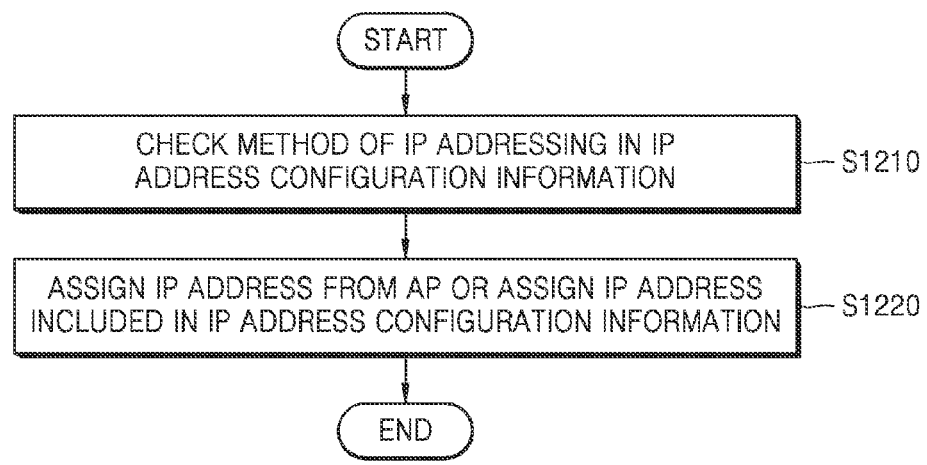
FIG. 12 illustrates a flowchart of a method according to an embodiment of the present disclosure.

FIG. 12 is a flowchart of a method according to an embodiment of the present disclosure.

Referring to FIG. 12, in operation 1210, the image forming apparatus 10 may check a method of IP addressing included in the IP address configuration information received from the mobile device 20.

In operation 1220, the AP 30 may assign an IP address to the image forming apparatus 10 according the method of IP addressing or may directly assign to the image forming apparatus 10 an IP address included in the IP address configuration information. For example, if the image forming apparatus 10 determines that the method of IP addressing is DHCP, the AP 30 having the DHCP function may assign an IP address to the image forming apparatus 10.

Moreover, if the image forming apparatus 10 determines that the method of IP addressing is a static method, the mobile device 20 may assign an IP address included in the IP address configuration information to the image forming apparatus 10.

Figure 13:
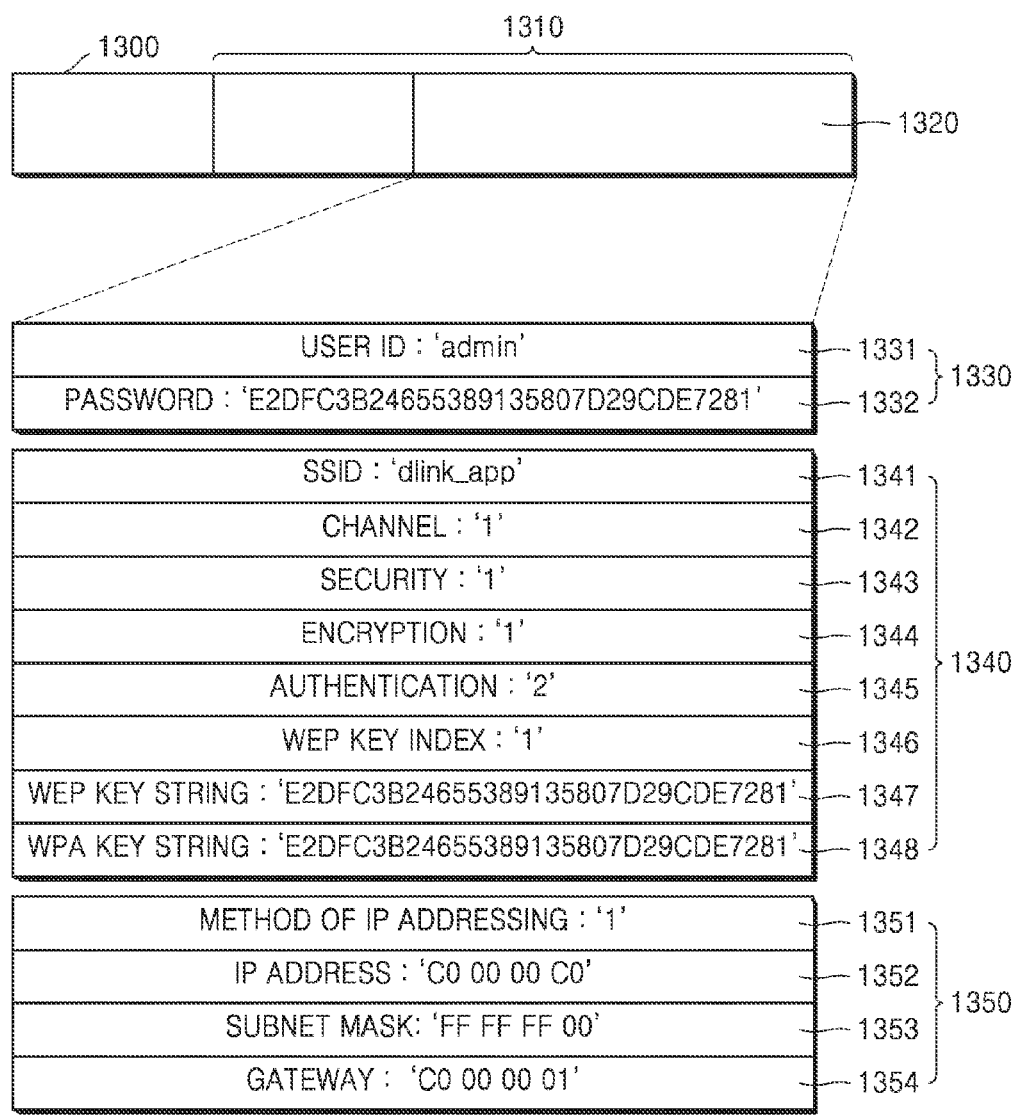
FIG. 13 illustrates an NFC data exchange format (NDEF) message according to an embodiment of the present disclosure.

FIG. 13 illustrates an NDEF message according to an embodiment of the present disclosure.

Referring to FIG. 13, the NDEF message 1300 includes an NDEF record 1310. The NDEF record 1310 includes an NDEF payload 1320. The NDEF payload 1320 refers to application data that is included in the NFEF record 1310.

The NDEF payload 1320 may include image forming apparatus authentication information 1330, wireless configuration information 1340, and IP address configuration information 1350. In detail, the NDEF payload 1320 may include a variety of information such as a user ID, a password, an SSID of an AP, a channel, security, encryption, authentication, a WEP key, a WPA key, a method of IP addressing, an IP address, a subnet mask, and a gateway.

The image forming apparatus authentication information 1330 refers to user authentication information associated with an image forming apparatus and may include a user ID field 1331 and a password field 1332. For example, in the case that a user ID is 'admin' and a password is 'samsung', the user ID field 1331 may have a value of 'admin' and the password field 1332 may have a value of 'E2DFC3B24655389135807D29CDE7281' in an encrypted form.

The wireless configuration information 1340 may include an SSID field 1341, a channel field 1342, a security field 1343, an encryption field 1344, an authentication field 1345, a WEP key index field 1346, a WEP key string field 1347, and a WPA key string field 1348.

The SSID field 1341 may have a value of an SSID of an AP. For example, the SSID field 1341 may have a value of 'dlink_app', which is an SSID of an AP. The channel field 1342 may have a value that denotes a channel used by an AP, and the security field 1343 may have a value regarding an encryption method. For example, if an encryption method used by an AP is WEP, WPA, or WPA2, the security field 1343 may respectively have a value of '1', '2', or '3'. The encryption field 1344 may have a value regarding an encryption algorithm of AP. For example, if an encryption algorithm is CCMP, TKIP, WEP-104, or WEP-40, the encryption field 1344 may respectively have a value of '1', '2', '3', or '4'. The authentication field 1345 may have a value regarding an authentication method of AP. For example, the authentication field 1345 may have a value of '1' for open authentication and a value of '2' for authentication by a shared key method.

The WEP key index field 1346 may have a value that denotes types of key that an AP may have. For example, in the case that an AP has four types of WEP key, the WEP key index field 1346 may have a value of 1-4.

The WEP key string field 1347 may have a value of a WEP key associated with the AP. For example, the WEP key string field 1347 may have a value of 'E2DFC3B24655389135807D29CDE7281', which is an encrypted value of a WEP key.

The WPA key string field 1348 may have a value of a WPA key associated with the AP. For example, the WPA key string field 1348 may have a value of 'E2DFC3B24655389135807D29CDE7281', which is an encrypted value of a WPA key.

The IP address configuration information 1350 may include a method of IP addressing field 1351, an IP address field 1352, a subnet mask field 1353, and a gateway field 1354.

The method of IP addressing field 1351 may have a value that denotes a method of assigning an IP address. For example, the method of IP addressing field 1351 may have a value of '1' for DHCP method and a value of '2' for a static method.

The IP address field 1352 may include a value of an IP address assigned to an image forming apparatus. For example, in the case that an IP address assigned to an image forming apparatus is '192.0.0.192', the IP address field 1352 may have a value of 'C0 00 00 C0'.

The subnet mask field 1353 may have a value that denotes a subnet mask of a network formed by an AP. The subnet mask field 1353 may have a value only when a method of IP addressing is a static method. For example, in the case that a subnet mask is '255.255.255.0', the subnet mask field 1353 may have a value of 'FF FF FF 00'.

The gateway field 1354 may have a value that denotes a gateway of a network formed by an AP. In the case that a gateway of a network formed by an AP is '192.0.0.1', the gateway field 1354 may have a value of 'C0 00 00 01'.

The image forming apparatus 10 according to an embodiment enables configuring a wireless connection between the image forming apparatus 10 and an AP 30 via NFC-tagging of a wireless configuration information providing apparatus such as the mobile device 20. Also, user authentication with respect to the image forming apparatus 10, wireless connection configuration, and IP address configuration may be performed by one-time NFC-tagging. Thus, security may be enhanced and user convenience may be increased.

The method of the related art is inconvenient as a user has difficulties in establishing a wireless connection between the image forming apparatus 10 and the mobile device 20 as the image forming apparatus 10 operates only in the NFC P2P mode or NFC reader mode. However, the image forming apparatus 10 according to an embodiment may operate in the card emulation mode and thus NDEF data may be exchange via NFC by a method of recording wireless configuration information on an NFC module of the image forming apparatus 10 thereby enabling a faster wireless connection between the image forming apparatus 10 and the mobile device 20 than the method of the related art and providing increased user convenience.

Although the image forming apparatus 10 according to an embodiment receives wireless configuration information by NFC-tagging of the mobile device 20, various embodiments are not limited thereto. The image forming apparatus 10 may receive wireless configuration information from the mobile device 20 using various communication modules such as a BT module and a Zigbee module. Also, the image forming apparatus 10 may perform user authentication with respect to an image forming apparatus and establish a wireless connection between the image forming apparatus 10 and the AP 30 by using the received wireless configuration information.

As described above, according to one or more of the above various embodiments, although manipulating a user interface included in an image forming apparatus is inconvenient, a wireless connection may be established using an electronic device that has a user interface that is relatively simple to manipulate, information related to wireless connection configuration is transmitted to the image forming apparatus using an NFC function, and the wireless connection is established between the image forming apparatus and the AP using the information related to the wireless connection configuration. That is, the wireless connection of the image forming apparatus may be easily configured based on the NFC function, and accordingly, the user may conveniently establish a wireless connection between the image forming apparatus and an AP.

The afore-described various embodiments may be implemented as an executable program and may be executed by a general-purpose digital computer that runs the program using a computer-readable recording medium. Also, a structure of data used in the method may be recorded by using various units on a computer-readable medium. Examples of the computer-readable medium include storage media such as magnetic storage media (e.g., read only memories (ROMs), floppy discs, or hard discs), optically readable media (e.g., compact disk-ROMs (CD-ROMs), or digital versatile disks (DVDs)), etc.

It should be understood that the various embodiments described therein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of configuring a wireless connection of an image forming apparatus via near field communication (NFC), the method comprising:
   receiving, by the image forming apparatus, when a mobile device is tagged by the image forming apparatus, wireless configuration information, user authentication information, and internet protocol (IP) address configuration information from the mobile device;
   performing user authentication of a user of the mobile device with respect to the image forming apparatus by using the user authentication information;

connecting the image forming apparatus to an access point (AP) based on the wireless configuration information; and assigning an IP address to the image forming apparatus based on the IP address configuration information, wherein the wireless configuration information is generated when communication is established between the mobile device and the AP.

2. The method of claim 1, wherein the assigning of the IP address comprises:

assigning, by the AP, the IP address to the image forming apparatus according to a method of IP addressing of the IP address configuration information, or assigning, by the image forming apparatus, an IP address comprised in the IP address configuration information to the image forming apparatus.

3. The method of claim 1, wherein the wireless configuration information and the IP address configuration information are input to the mobile device via a user interface of the mobile device.

4. The method of claim 1, wherein the image forming apparatus does not request transmission or receipt of information to or from the mobile device, and wherein the image forming apparatus is further configured, according to a request of the mobile device, to:

receive and store the wireless configuration information and the IP address configuration information from the mobile device, or read out information stored in the image forming apparatus.

5. The method of claim 1, wherein the performing of the user authentication comprises comparing authentication information stored in advance in at least one of the image forming apparatus or a server connected to the image forming apparatus with the received user authentication information.

6. The method of claim 1, wherein, if the user authentication fails, the image forming apparatus does not establish communication with the AP.

7. A non-transitory computer readable recording medium having recorded thereon a computer program for executing the method of claim 1.

8. An image forming apparatus that supports near field communication (NFC) function, the apparatus comprising:

a transceiver configured to establish communication wirelessly with an access point (AP);

a memory configured to store instructions therein;

an NFC transceiver configured to receive wireless configuration information and internet protocol (IP) address configuration information from a mobile device; and at least one processor, wherein, upon execution of the instructions, the at least one processor is configured to:

control the NFC transceiver to receive wireless configuration information and IP address configuration information from the mobile device when the mobile device is tagged by the image forming apparatus, perform user authentication of a user of the mobile device with respect to the image forming apparatus by using the authentication information, establish, using the transceiver, communication with the AP based on the wireless configuration information, and control the transceiver to assign an IP address based on the received IP address configuration information, wherein the wireless configuration information is generated when communication is established between the mobile device and the AP.

9. The apparatus of claim 8, wherein the at least one processor is further configured to control the transceiver to receive the IP address from the AP based on a method of IP addressing associated with the IP address configuration information, and wherein the IP address is assigned by the transceiver when the transceiver is assigned the IP address.

10. The apparatus of claim 8, wherein the wireless configuration information and the IP address configuration information are input to the mobile device via a user interface of the mobile device.

11. The apparatus of claim 8, wherein the at least one processor is further configured to:

control the NFC transceiver to not request transmission or receipt of information to or from the mobile device, and based on a request of the mobile device, control the NFC transceiver to:

receive and store the wireless configuration information and the IP address configuration information, or read out information stored in the image forming apparatus.

12. The apparatus of claim 8, wherein the at least one processor is further configured to compare the authentication information stored in advance in at least one of the image forming apparatus or a server connected to the image forming apparatus with the received user authentication information.

13. The apparatus of claim 8, wherein the at least one processor is further configured to control the transceiver such that, if the authentication fails, the image forming apparatus does not establish communication with the AP.

14. An image forming system comprising:

a mobile device configured to:

receive wireless configuration information, user authentication information, and internet protocol (IP) address configuration information from a user, and transmit, when the mobile device is tagged by an image forming apparatus, the received wireless configuration information, the user authentication information, and the IP address configuration information to the image forming apparatus; and an image forming apparatus configured to:

receive the wireless configuration information, the user authentication information, and the IP address configuration information from the mobile device when the mobile device is tagged by the image forming apparatus, perform user authentication of the user with respect to the image forming apparatus by using the user authentication information, establish communication with an access point (AP) based on the wireless configuration information, and determine an IP address associated with the IP address configuration information, wherein the wireless configuration information is generated when communication is established between the mobile device and the AP.

* * * * *